(12) United States Patent
Sekiguchi

(10) Patent No.: US 7,984,011 B2
(45) Date of Patent: Jul. 19, 2011

(54) POLICY CHANGE PROCESSING PROGRAM, POLICY CHANGE PROCESSING METHOD, POLICY CHANGE PROCESSING APPARATUS

(75) Inventor: Atsuji Sekiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/498,677

(22) Filed: Jul. 7, 2009

(65) Prior Publication Data

US 2009/0271355 A1    Oct. 29, 2009

Related U.S. Application Data

(63) Continuation of application No. PCT/JP2007/051948, filed on Feb. 5, 2007.

(51) Int. Cl.
*G06F 17/00* (2006.01)
*G06N 7/00* (2006.01)
*G06N 7/08* (2006.01)

(52) U.S. Cl. .......................................... 706/59

(58) Field of Classification Search ................ 706/59
See application file for complete search history.

(56) References Cited

U.S. PATENT DOCUMENTS
2006/0041928 A1    2/2006 Masuoka

FOREIGN PATENT DOCUMENTS
| JP | A 2000-155680 | 6/2000 |
| JP | A 2005-182478 | 7/2005 |
| JP | A 2005-311654 | 11/2005 |
| JP | A 2006-58938 | 3/2006 |

OTHER PUBLICATIONS

Edmund M. Clarke, et al., "Model Checking," ISBN 0-262-03270-8; The MIT Press, Cambridge, Massachusetts, 1999.
Emil C. Lupu, et al., "Conflicts in Policy-Based Distributed Systems Management," IEEE Transactions on Software engineering, vol. 25, No. 6, pp. 852-869, Nov./Dec. 1999.
Nicole Dunlop, et al., "Dynamic Conflict detection in Policy-Based Management Systems," Proceedings of the Sixth International Enterprise Distributed Object Computing Conference, 2002 (EDOC '02), pp. 15-26; 2002.

*Primary Examiner* — Jeffrey A Gaffin
*Assistant Examiner* — Peter Coughlan
(74) *Attorney, Agent, or Firm* — Fujitsu Patent Center

(57) ABSTRACT

A policy change processing apparatus is used for controlling a system, and processes a change in a content of a plurality of policies specified so that contents of the policies do not conflict with each other. The policy change processing apparatus includes: a changeable scope storing unit that stores therein a changeable scope for each of the policies, the changeable scope indicating a scope where a policy content is changeable without causing a conflict with any other policies; and a changeable scope determining unit that determines whether a policy content accepted as a change target of a predetermined policy is within the changeable scope of the predetermined policy, the changeable scope being stored in the changeable scope storing unit.

11 Claims, 16 Drawing Sheets

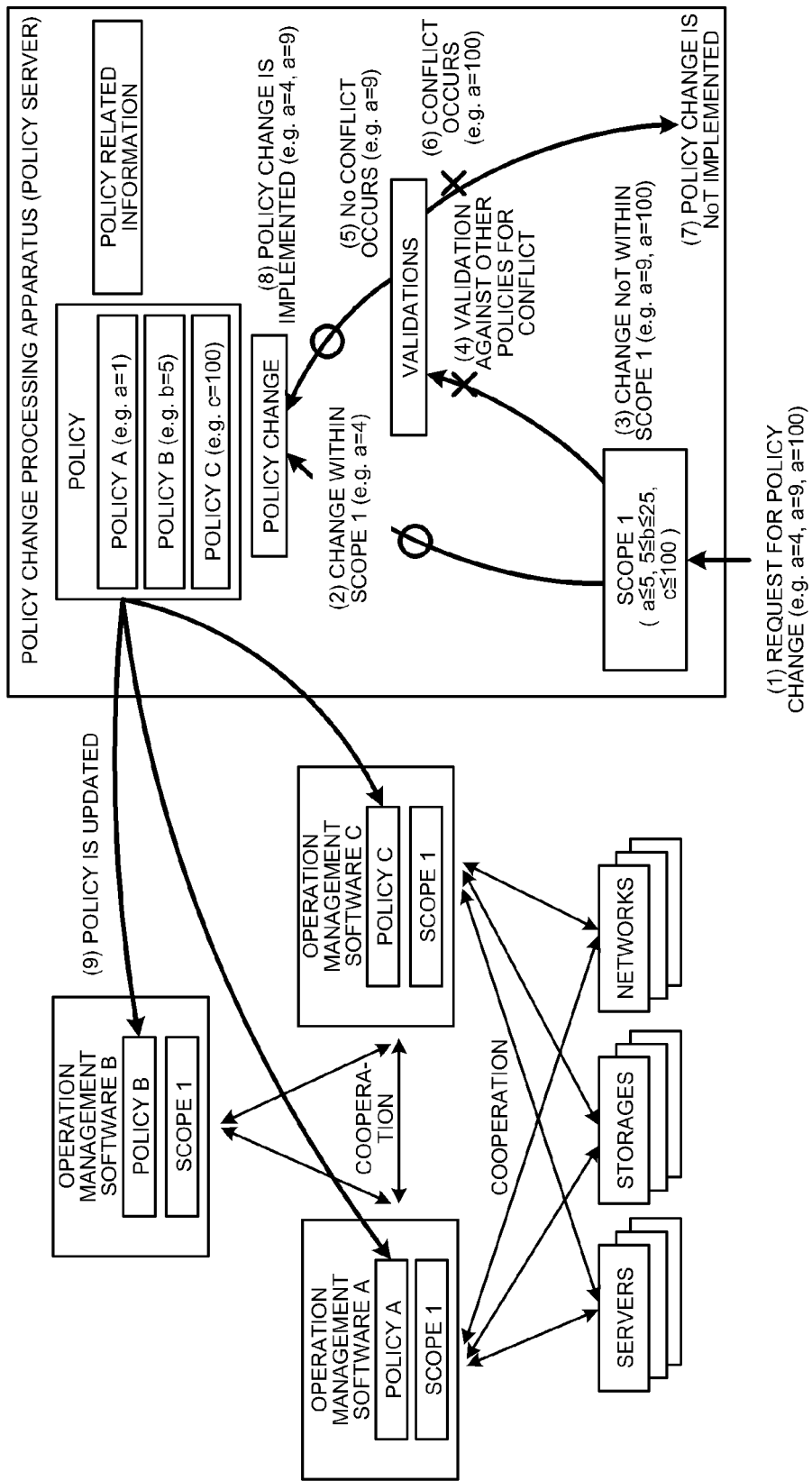

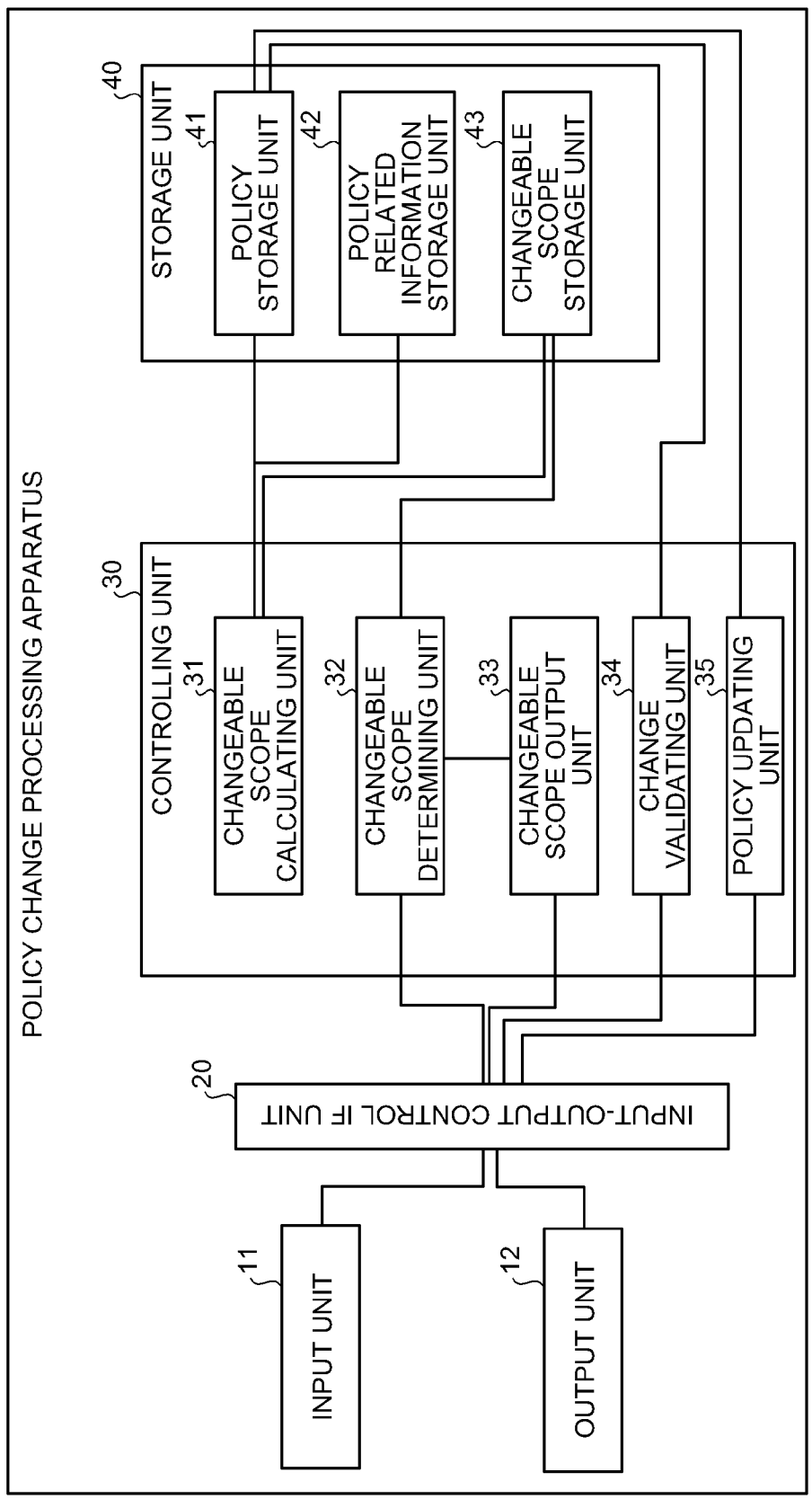

FIG.3

| POLICY NUMBER | TYPE | POLICY CONTENT |
|---|---|---|
| 1 | DECLARATION TYPE | NUMBER OF SERVERS INITIALLY DEPLOYED a=1 |
| 2 | DECLARATION TYPE | UPPER LIMIT, SERVER POOL b=5 |
| 3 | DECLARATION TYPE | UPPER LIMIT, NUMBER OF TRANSACTIONS [/s] c=100 |
| 4 | RULE TYPE | IF(SERVICE LIMIT REPORT) THEN {PERFORM CAPACITY PLANNING} |
| 5 | RULE TYPE | IF(NUMBER USED IN SERVER POOL d<5 && RESPONSE TIME [s] e>1) THEN {ADDITIONAL INSTALLATION,d++} |
| 6 | RULE TYPE | IF(d==5&&e>1)THEN {REPORT("SERVICE LIMIT")} |
| 7 | RULE TYPE | IF(NUMBER OF ALERTS f>10)THEN {REPORT("ERROR HAS OCCURRED")} |
| 8 | DECLARATION TYPE | UPPER LIMIT, NUMBER OF SHARABLE SERVERS s=25 |

FIG.4

| ORDER | RELATED POLICY NUMBERS | HOW RELATED |
|---|---|---|
| 1 | 1, 2 | a<=b |
| 2 | 2, 3 | c<=b*20 |
| 3 | 2, 5 | d<b |
| 4 | 2, 6 | d<=b |
| 5 | 2, 8 | b<=s |

FIG.5

| POLICY NUMBER | SCOPE 1 |
|---|---|
| 1 | a<=5 |
| 2 | 5<=b<=25 |
| 3 | c<=100 |
| 4 | - |
| 5 | d<5 |
| 6 | d<=5 |
| 7 | - |
| 8 | s>=5 |

FIG.6

FOLLOWING POLICY <u>CAN BE CHANGED IMMEDIATELY</u>

POLICY CHANGE CONTENT:

POLICY NUMBER: 1

POLICY CHANGE CONTENT: x=4

THIS CHANGE INFLUENCES POLICY(IES) WITH FOLLOWING POLICY NUMBER(S):
2

SCOPE OF VALUES CHANGEABLE WITHOUT PERFORMING RE-VALIDATIONS:
EQUAL TO OR LESS THAN 5

IMPLEMENT CHANGE?

[YES]  [NO]

FIG.11

| POLICY GROUP | POLICY NUMBER |
|---|---|
| 1 | 1 |
| | 2 |
| | 3 |
| 2 | 4 |
| 3 | 5 |
| | 6 |
| | 7 |
| 4 | 8 |

FIG.12

| POLICY NUMBER | SCOPE 2 |
|---|---|
| 1 | – |
| 2 | b<=25 |
| 3 | – |
| 4 | – |
| 5 | d<5 |
| 6 | d<=5 |
| 7 | – |
| 8 | s>=5 |

FIG.15

FOLLOWING POLICY REQUIRES IN-GROUP VALIDATIONS
POLICY CHANGE CONTENT:

POLICY NUMBER  [2]

POLICY CHANGE CONTENT  [x=2]

THIS CHANGE INFLUENCES POLICY(IES) WITH FOLLOWING POLICY NUMBER(S):
1,2,3
THIS CHANGE ALSO INFLUENCES FOLLOWING POLICY GROUP(S):
1
SCOPE OF VALUES CHANGEABLE ONLY WITH IN-GROUP RE-VALIDATIONS:
EQUAL TO OR LESS THAN 25

IMPLEMENT CHANGE?

[ YES ]     [ NO ]

FIG.16

FOLLOWING POLICY <u>REQUIRES ENTIRE VALIDATIONS</u>
POLICY CHANGE CONTENT:

POLICY NUMBER   [ 2 ]

POLICY CHANGE CONTENT   [ x=100 ]

THIS CHANGE INFLUENCES POLICY(IES) WITH FOLLOWING POLICY NUMBER(S):
1,2,3

THIS CHANGE ALSO INFLUENCES FOLLOWING POLICY GROUP(S):
1

SCOPE OF VALUES CHANGEABLE WITHOUT PERFORMING RE-VALIDATIONS:
$5 \leq b \leq 25$ SCOPE OF VALUES CHANGEABLE ONLY WITH IN-GROUP RE-VALIDATION:
$b \leq 25$

IMPLEMENT CHANGE?

[ YES ]     [ NO ]

POLICY CHANGE PROCESSING PROGRAM, POLICY CHANGE PROCESSING METHOD, POLICY CHANGE PROCESSING APPARATUS

CROSS-REFERENCE TO RELATED APPLICATION(S)

This application is a continuation of PCT international application Ser. No. PCT/JP2007/051948 filed on Feb. 5, 2007 which designates the United States, the entire contents of which are incorporated herein by reference.

FIELD

The embodiments discussed herein are directed to a policy change processing program, a policy change processing method, and a policy change processing apparatus.

BACKGROUND

As well known in the art, there is a system controlled by a plurality of policies (operation policies) (policy-based control). In such a system, contents of the policies are specified so as not to conflict with each other. Therefore, upon changing a policy for the system, the policy needs to be changed so that the policies do not become conflictive with each other due to such a policy change.

Such a policy in the system using the policy-based control is almost the same as a control program to the system. Therefore, if any policies are incorrect (have any conflict), the system operates according to the incorrect way specified in the policy. Therefore, it has been necessary to validate whether policies are appropriate in advance (before implementing a policy change), and various efforts have been made.

For example, E. C. Lupu, M. S. Sloman ("Conflicts in Policy-Based Distributed Systems Management", IEEE Transactions on Software Engineering—Special Issue on Inconsistency Management, 1999), and Nicole Dunlop, Jadwiga Indulska, Kerry Raymond ("Dynamic Conflict Detection in Policy-Based Management Systems", 2002) suggest methods for validating that there is no conflict among a plurality of policies, and that the policies are appropriate in advance. In addition, E M Clarke, O. Grumberg, and D. Peled (Model Checking. MIT Press, 1999) suggest a method such as model detection. In this model detection, to validate whether policies are appropriate, it is examined whether a target condition is achieved by allowing a system to be controlled by the policies. Furthermore, because such validations generally require a large amount of calculations, Nicole Dunlop, Jadwiga Indulska, Kerry Raymond ("Dynamic Conflict Detection in Policy-Based Management Systems", 2002) described above suggest a method for performing validations in advance, or addressing this issue dynamically by reducing the amount of calculation by devising formulas used for validations.

In addition to these technologies, other suggestions have been made. Such suggestions include a method for correcting a decision rule tree (Japanese Laid-open Patent Publication No. 2000-155680, pages 1 to 3, FIG. 3). In this method, upon correcting a decision rule tree, instead of correcting each and every parameter, the decision rule tree is gone back from an incorrect decision rule to a branch that leads to a correct decision, and correcting only decision rules belonging to that branch. Another suggestion includes a method for reducing a size of a computer program used for validating input information, by performing any one of changing and adding or both against definitions for validating the input information (Japanese Laid-open Patent Publication No. 2005-311654, pages 1 to 4, FIG. 2).

SUMMARY

According to an aspect of the invention, a computer readable storage medium containing instructions for processing a change in a content of a plurality of policies specified so that contents of the policies do not conflict with each other. The instructions, when executed by a computer, cause the computer to execute: storing a changeable scope for each of the policies in a first storage unit, the changeable scope indicating a scope where a policy content is changeable without causing a conflict with any other policies; and determining whether a policy content accepted as a change target of a predetermined policy is within the changeable scope of the predetermined policy, the changeable scope being stored in the storing of the changeable scope.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWING(S)

FIG. 1 is an illustrative diagram of an overview and characteristics of a policy change processing apparatus according to a first embodiment of the present invention;

FIG. 2 is a block diagram of a structure of the policy change processing apparatus according to the first embodiment;

FIG. 3 is a diagram of an example of policies stored in a policy storage unit according to the first embodiment;

FIG. 4 is a diagram of an example of policy related information stored in a policy related information storage unit according to the first embodiment;

FIG. 5 is a diagram of an example of changeable scopes stored in a changeable scope storage unit according to the first embodiment;

FIG. 6 is a diagram of an example of a screen indicating a result of a policy change determination process according to the first embodiment;

FIG. 11 is a diagram of an example of policy groups stored in a policy group storage unit according to the second embodiment;

FIG. 12 is a diagram of an example of out-of-group changeable scopes stored in a changeable scope storage unit according to the second embodiment;

FIG. 15 is a diagram of an example of a screen indicating a result of a policy change determination process according to the second embodiment;

FIG. 16 is a diagram of an example of a screen indicating another result of the policy change determination process according to the second embodiment;

DESCRIPTION OF EMBODIMENT(S)

Figure 7:
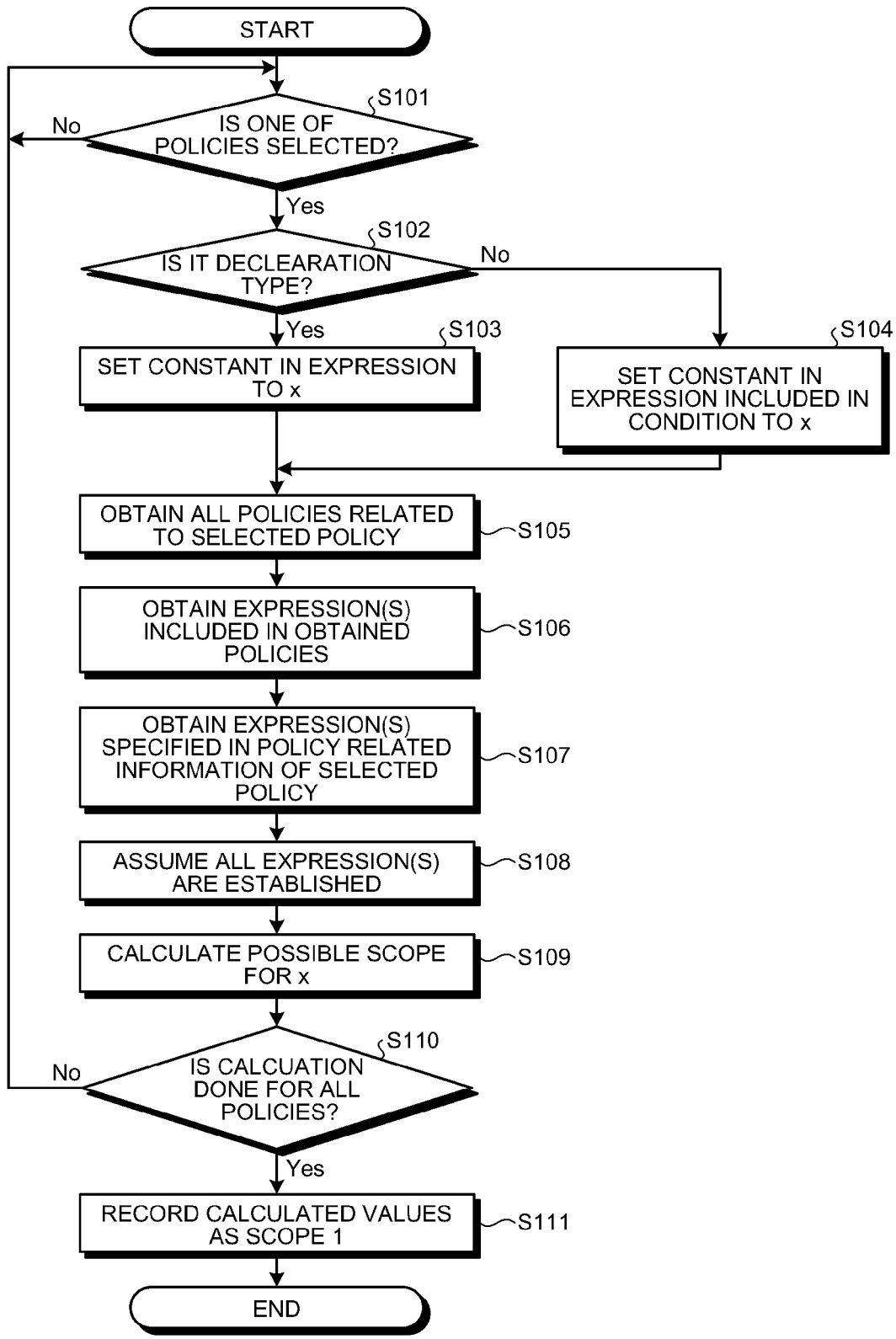
FIG. 7 is a flowchart of a changeable scope calculation process according to the first embodiment.

The previously-described conventional technologies have a problem that, when a policy content is changed, such a change needs to be validated against every other policy to examine whether the change results in any conflict therewith, regardless of a type of the policy change (e.g., even if such a policy change is very trivial). In other words, it is not possible, upon implementing a policy change, to figure out whether it is necessary to perform a validation against every other policy for a conflict. Therefore, the validation cannot be omitted in any situation, and the validation must be always performed.

This problem will now be explained more specifically. With a policy-based control, when an operation policy of a system needs to be changed (an operation policy may be changed so that the system operates more appropriately, for example), a corresponding policy is changed. Because there are various types of policy changes, some policy changes may be trivial. More specifically, only part of a policy may be changed slightly, for example. To explain such a situation with an example, it is assumed herein that a policy "to cause a troubleshooting process to be performed when an alert, issued when response time exceeds a threshold, is issued three times in series", and operation of such a policy cause troubleshooting processes, due to an erroneous detection even though a trouble does not occur. The policy might be changed to cause the troubleshooting process to be performed when the alert, issued when the response time exceeds the threshold, is issued five times in series (the three-time is changed to the five-time), to reduce the troubleshooting processes due to the erroneous detection by increasing the number of alerts for calling the exception process to five times (that is, to cause the system to operate more appropriately).

Although the policy change is trivial, it cannot be determined beforehand whether the policy change would result in a conflict with any other policies. This is because, for example, only a partial policy change can give an influence to an entire system, thus causing a conflict with some other policies. To explain such a situation with an example, if a policy specifying the number of alerts causing a troubleshooting process is changed (a change to increase the number of alerts), the change might violate (conflict with) a service level agreement (SLA) for the entire system. Therefore, it is necessary to validate a policy against every other policy for a conflict before effecting any policy change, regardless of the type of the policy change (even if the policy change is a trivial one).

Embodiments of a policy change processing program, a policy change processing method, and a policy change processing apparatus of the present invention will now be explained in detail with reference to the attached drawings. In the explanation below, an overview, features, and a structure of the policy change processing apparatus according to the embodiments, and a flow of a process performed thereby will be described one by one.

[a] First Embodiment

Explanation of Terms

To begin with, key terms used in description of the first embodiment will be provided. A "policy (corresponding to the "policy" as mentioned in the claims)", used in the description of the first embodiment, represents an operational guideline of a whole system, or an operational guideline that is divided arbitrarily depending on a process unit or a type of a process. For example, the operational guideline of the whole system is divided by software (e.g., operation management software, resource management software, service quality management software).

There are a declaration type and a rule type in representation forms of policy used in the first embodiment. The declaration type specifies a goal that a system should reach, or a constraint that a system must always follow. The declaration type is, for example, defined by an equation. For example, a policy with the "number of servers initially deployed a=1" indicates a constraint in which "the parameter a indicating the number of servers initially deployed must equal to 1". On the contrary, a rule type policy is expressed in IF-THEN format, and describes a rule to cause an action specified by THEN to be executed when a condition specified by IF is met. Such a condition is expressed by an inequation, and the action is expressed by some kind of an operation of a parameter. For example, a policy with "IF (the number used in server pool d<5 && response time [s] e>1)THEN[additional installation, d++]" indicates a rule to cause an "additional installation" process to be executed and to increment the parameter d by 1 if the parameter d indicating the number used in the server pool is less than 5 and if the parameter e indicating the response time [s] is greater than 1.

<Overview and Features of Policy Change Processing Apparatus>

To begin with, an overview and characteristics of the policy change processing apparatus according to the first embodiment will be explained with reference to FIG. 1. FIG. 1 is an illustrative diagram of the overview and the characteristics of the policy change processing apparatus according to the first embodiment.

As depicted in this diagram, there is a system that is controlled by a plurality of policies (operation policies) (policy-based control). In this system, policy contents are specified so that the policies do not conflict with each other. For example, in the system depicted in FIG. 1, a policy A in operation management software A, a policy B in operation management software B, and a policy C in operation management software C cooperate with each other to control the system including servers, storages, and networks. The contents of the policy A, the policy B, and the policy C are specified so as not to conflict with each other.

The policy change processing apparatus according to the first embodiment is an apparatus for processing a content change of a policy in a plurality of policies that is used for controlling the system and whose contents are specified not to conflict with each other. A main feature of the policy change processing apparatus, whose overview is provided above, is to enable determination whether it is necessary, upon implementing a policy change, to validate the policy change against every other policy for a conflict, and depending on situations, validations to be omitted.

In other words, the policy change processing apparatus according to the first embodiment stores therein, for each of the policies, a changeable scope where a content of a policy is changeable without causing a conflict with any other policies. For example, as depicted in FIG. 1, the policy change processing apparatus has a "policy A (e.g., a=1)", a "policy B (e.g., b=5)", and a "policy C (e.g., c=100)" as the policies, and stores therein, for each of these policies, a "scope 1 (a≦5, 5≦b≦25, c≦100)" that is a changeable scope from "policy related information" that is related information.

The policy change processing apparatus according to the first embodiment determines whether a policy content, accepted as a change for a predetermined policy, is within a changeable scope of the predetermined policy. More specifically, if the accepted policy change (for example, "a=4") is within the changeable scope of the predetermined policy (for example, a≦5) (see (2) in FIG. 1), the policy change processing apparatus determines that validations are not necessary, and implements the policy change (see (8) in FIG. 1). In other words, the policy change processing apparatus changes the policy without validating if the change results in any conflict with any other policies.

If the policy change processing apparatus according to the first embodiment determines that an accepted policy change (for example, "a=9") is not within the changeable scope of that predetermined policy (for example, a≦5) (see (3) in FIG. 1), the policy change processing apparatus determines that validations are necessary, and validates whether the change results in a conflict with any other policies (see (4) in FIG. 1). Such validations for a conflict may be performed by the policy change processing apparatus according to the first embodiment (for example, when the policy change processing apparatus incorporates a validation function), or may not be performed by the policy change processing apparatus according to the first embodiment (for example, when the validations are performed by an external apparatus or manually).

As a result of the validations, if the policy change processing apparatus according to the first embodiment determines that the policy change results in a conflict (for example, "a=100"), the policy change processing apparatus does not implement the policy change (see (7) in FIG. 1). If the policy change does not result in any conflict (for example, "a=9"), the policy change is implemented (see (8) in FIG. 1). When the policy change is implemented, the policies (for example, the policy A in the operation management software A, the policy B in the operation management software B, and the policy C in the operation management software C) in the system are updated (see (9) in FIG. 1).

In this manner, as described above as the main feature, the policy change processing apparatus according to the first embodiment can determine, upon implementing a policy change, whether such a policy change needs to be validated against every other policy for a conflict, and depending on situations, omit the validations. In other words, if a policy content, accepted as a change, can be determined to be within a changeable scope, the policy change can also be implemented quickly without validating the change against every other policy for a conflict.

<Structure of Policy Change Processing Apparatus>

A structure of the policy change processing apparatus according to the first embodiment will now be explained with reference to FIG. 2. FIG. 2 is a block diagram of a structure of the policy change processing apparatus according to the first embodiment. As depicted in this diagram, the policy change processing apparatus includes an input unit 11, an output unit 12, an input-output control IF unit 20, a controlling unit 30, and a storage unit 40.

The input unit 11 accepts inputs of various information and corresponds to, for example, a keyboard, a mouse, or a microphone. In relation to the present invention, the input unit 11 accepts and receives a policy change, for example. The output unit 12 outputs various information and corresponds to, for example, a monitor (or a display or a touch panel) or a speaker. In relation to the present invention, the output unit 12 displays and outputs a changeable scope determination result, for example, to be described later. The input-output control IF unit 20 controls communications of various information exchanged in the policy change processing apparatus. In relation to the present invention, the input-output control IF unit 20 controls communications of a policy change input via the input unit 11 and transferred to the controlling unit 30 to be described later.

The storage unit 40 stores therein data and computer programs required for various processes. In close relation to the present invention, the storage unit 40 includes a policy storage unit 41, a policy related information storage unit 42, and a changeable scope storage unit 43.

The policy storage unit 41 stores therein, for each of a plurality of policies, a policy content defined by an expression including an equation and/or an inequation. More specifically, as depicted in FIG. 3, the policy storage unit 41 stores therein: a "policy number" uniquely identifying a policy; a "policy type" indicating a type of a policy; and a "policy content" indicating a content of a policy, by being related to one another.

For example, in an example depicted in FIG. 3, the policy storage unit 41 stores therein "1", "declaration type", and "the number of servers initially deployed a=1" as a "policy number", a "policy type" and a "policy content", respectively, by being related one another. The policy storage unit 41 also stores therein "5", "rule type", and "IF (the number used in server pool d<5 && response time [s] e>1)THEN[additional installation, d++]" as a "policy number", a "policy type" and a "policy content", respectively, by being related one another. FIG. 3 is a diagram of an example of policies stored in the policy storage unit according to the first embodiment.

The policy related information storage unit 42 stores therein, for each of the plurality of policies, related information indicating whether the policy has a relationship with any other policies possibly resulting in a conflict. More specifically, as depicted in FIG. 4, the policy related information storage unit 42 stores therein: an "order" uniquely identifying related information; a "related policy number" indicating a policy having a relationship possibly resulting in a conflict with other policies; and "how related" indicating how these related policies are related, by being related to one another.

For example, in the example depicted in FIG. 4, the policy related information storage unit 42 stores therein "1", "1,2", and "a≦b" as an "order", a "related policy number", and "how related", respectively, by being related one another. The policy related information storage unit 42 also stores therein "2", "2,3", and "c≦b*20" as an "order", a "related policy number", and "how related", respectively, by being related one another. FIG. 4 is a diagram of an example of the policy related information stored in the policy related information storage unit according to the first embodiment.

The changeable scope storage unit 43 stores therein, for each of the policies, a changeable scope where a content of a policy is changeable without causing a conflict with any other policy. More specifically, the changeable scope storage unit 43 stores therein a changeable scope calculated by a changeable scope calculating unit 31, which is to be described later. To describe more in details, the changeable scope calculating unit 31 stores therein, as depicted in FIG. 5, a "policy number" and an item of "scope 1" indicating a changeable scope while being related to each other.

For example, in the example depicted in FIG. 5, the changeable scope storage unit 43 stores therein "1" and "a≦5" as a "policy number" and an item of "scope 1", respectively, by being related to each other, and stores therein "2" and "5≦b≦25" as a "policy number" and an item of "scope 1", respectively, by being related to each other. FIG. 5 is a diagram of an example of the changeable scopes stored in the changeable scope storage unit according to the first embodiment.

The controlling unit 30 has an internal memory that stores therein control programs such as an operating system (OS), computer programs specifying various processes, and necessary data, and executes various processes to control the policy change processing apparatus. In close relation to the present invention, the controlling unit 30 includes the changeable scope calculating unit 31, a changeable scope determining unit 32, a changeable scope output unit 33, a change validating unit 34, and a policy updating unit 35, as depicted in FIG. 2.

The changeable scope calculating unit 31 obtains other policies that possibly result in a conflict with a selected policy, from the related information stored in the policy related information storage unit 42. The changeable scope calculating unit 31 then reads the policy content of each of the obtained other policies to calculate a changeable scope. More specifically, the changeable scope calculating unit 31 calculates a changeable scope by solving expressions included in the policy content of the selected policy, the policy contents of the other policies read from the policy storage unit 41, and the information indicating how the selected policy is related to the obtained other policies, as simultaneous. A process performed by the changeable scope calculating unit 31 will be described later in details with reference to FIG. 7.

The changeable scope determining unit 32 determines whether a policy content, accepted as a change of a predetermined policy, is within the changeable scope of the predetermined policy stored in the changeable scope storage unit 43. More specifically, upon accepting a policy change (for example, "a=4", "a=9"), the changeable scope determining unit 32 determines whether the accepted policy change is within a predetermined changeable scope (for example, "a≦5"). If it is determined that the change is within the scope where the predetermined policy can be changed, the changeable scope determining unit 32 determines that the validations are not necessary. If it is determined that the accepted policy change (for example, "a=9") is not within the scope where the predetermined policy can be changed (for example, "a≦5"), the changeable scope determining unit 32 then determines that the validations are necessary to see whether the change would result in a conflict with any other policies. The changeable scope determining unit 32 then, for example, transfers the determination result to the changeable scope output unit 33, which is to be described later.

The changeable scope output unit 33 outputs the result of the determination performed by the changeable scope determining unit 32 to the output unit 12. For example, as depicted in FIG. 6, upon receiving the determination result from the changeable scope determining unit 32, the changeable scope output unit 33 displays, via the output unit 12, a screen data having: the result of the determination performed by the changeable scope determining unit 32; fields displayed in response to acceptance of the policy change (that is, the "policy number" and the "policy change content"); policies related to the accepted policy change; the changeable scope for the accepted policy change; a "YES" button for accepting a changing process; and a "NO" button for ending the process without performing the change process.

For example, in the example depicted in FIG. 6, the changeable scope output unit 33 displays a screen having: "can be changed immediately" as the result of the determination; "4", and policy numbers "1, 2" of the policies related to the accepted policy change, in the fields displayed in response to the acceptance of the policy change; and "equal to or less than 5" as the changeable scope for the accepted policy change. FIG. 6 is a diagram of an example of a screen indicating a result of a policy change determination according to the first embodiment.

Upon accepting a command to implement a policy change, the change validating unit 34 validates whether the policy updating unit 35 should implement the policy change. More specifically, upon accepting a command to implement a policy change (e.g., in the example depicted in FIG. 6, upon accepting a command for "YES"), if the changeable scope determining unit 32 determines that the validations are not necessary for the accepted policy change, the change validating unit 34 instructs and causes the policy updating unit 35 to implement the policy change, and the process is ended. If the changeable scope determining unit 32 determines that the accepted policy change needs to be validated against every other policy for a conflict, the validations are executed. If, as a result of the validations, it is determined that no problem occurs (no conflict would occur), the change validating unit 34 instructs and causes the policy updating unit 35 to implement the change, and the process is ended. If it is determined that a problem occurs (a conflict would occur) the change validating unit 34 notifies the user that the change is not permitted, and the process is ended. If no command is accepted for the policy change (for example, in the example depicted in FIG. 6, upon accepting a command for "NO"), the process is ended.

Upon accepting the instruction to implement the change from the change validating unit 34, the policy updating unit 35 reflects and updates the content of the policy change, input via the input unit 11, to the policy stored in the policy storage unit 41. For example, in the example depicted in FIG. 6, the policy is changed so that "a=1" in the "policy 1" is changed to "a=4".

Such a policy change processing apparatus can also be realized by loading each of the functionalities of these units described above to a known information processing apparatus such as a personal computer or a work station.

<Changeable Scope Calculation Process Performed by Policy Change Processing Apparatus>

A changeable scope calculation process according to the first embodiment will now be explained with reference to FIG. 7. FIG. 7 is a flowchart of the changeable scope calculation process according to the first embodiment.

As depicted in FIG. 7, when the system is at first started, the changeable scope calculating unit 31 selects one of the policies stored in the policy storage unit 41 (Step S101), and determines whether the selected policy is a declaration type or a rule type (Step S102). If the policy is a declaration type (YES at Step S102), the changeable scope calculating unit 31 sets a constant in an expression included in the policy content to "x" (Step S103). If the policy is not a declaration type (NO at Step S102), that is, if the policy is a rule type, the changeable scope calculating unit 31 sets a constant in an expression included in the condition of this policy to "x" (Step S104). For example, if a policy with "policy number: 1" and "policy content: the number of servers initially deployed a=1" is selected, because this policy is a declaration type, it is set to "the number of servers initially deployed a=x".

The changeable scope calculating unit 31 then obtains all policies related to the selected policy from the policy related information storage unit 42 (Step S105). For example, if the policy with "policy number: 1" and "policy content: the number of servers initially deployed a=1" is selected, "policy number: 2" that is a policy number related to "policy number: 1" is obtained (See FIG. 4). The changeable scope calculating unit 31 then obtains the "policy content" corresponding to "policy number: 2", that is, "upper limit, server pool b=5" (see FIG. 3).

The changeable scope calculating unit 31 obtains expression(s) included in all of the obtained policies (Step S106). For example, if the changeable scope calculating unit 31 obtains the policy with "policy number: 2", "b=5" is obtained (see FIG. 3). The changeable scope calculating unit 31 then obtains, for the selected policy, "how related" stored in the policy related information storage unit 42 (Step S107). In this example, "a≦b" is obtained (See FIG. 4).

Then, the changeable scope calculating unit 31 assumes that each one of the obtained expression(s) is established (Step S108), and calculates a possible scope for the "x" (Step S109). For example, by assuming that "a=x", "b=5", and "a≦b" are established to calculate "x", "a≦5" is obtained (See FIGS. 3 and 4).

If the changeable scope calculating unit 31 completes calculating the changeable scope for every one of these policies (YES at Step S110), the calculated changeable scopes are recorded as scope 1 in the changeable scope storage unit 43, and the process is ended (Step S111). If the changeable scope calculating unit 31 does not complete calculating a changeable scope for every one of these policies (NO at Step S110), the changeable scope calculating unit 31 selects other policies, and calculates changeable scopes (Steps S101 to S109).

<Policy Change Determination Process Performed by Policy Change Processing Apparatus>

Figure 8:
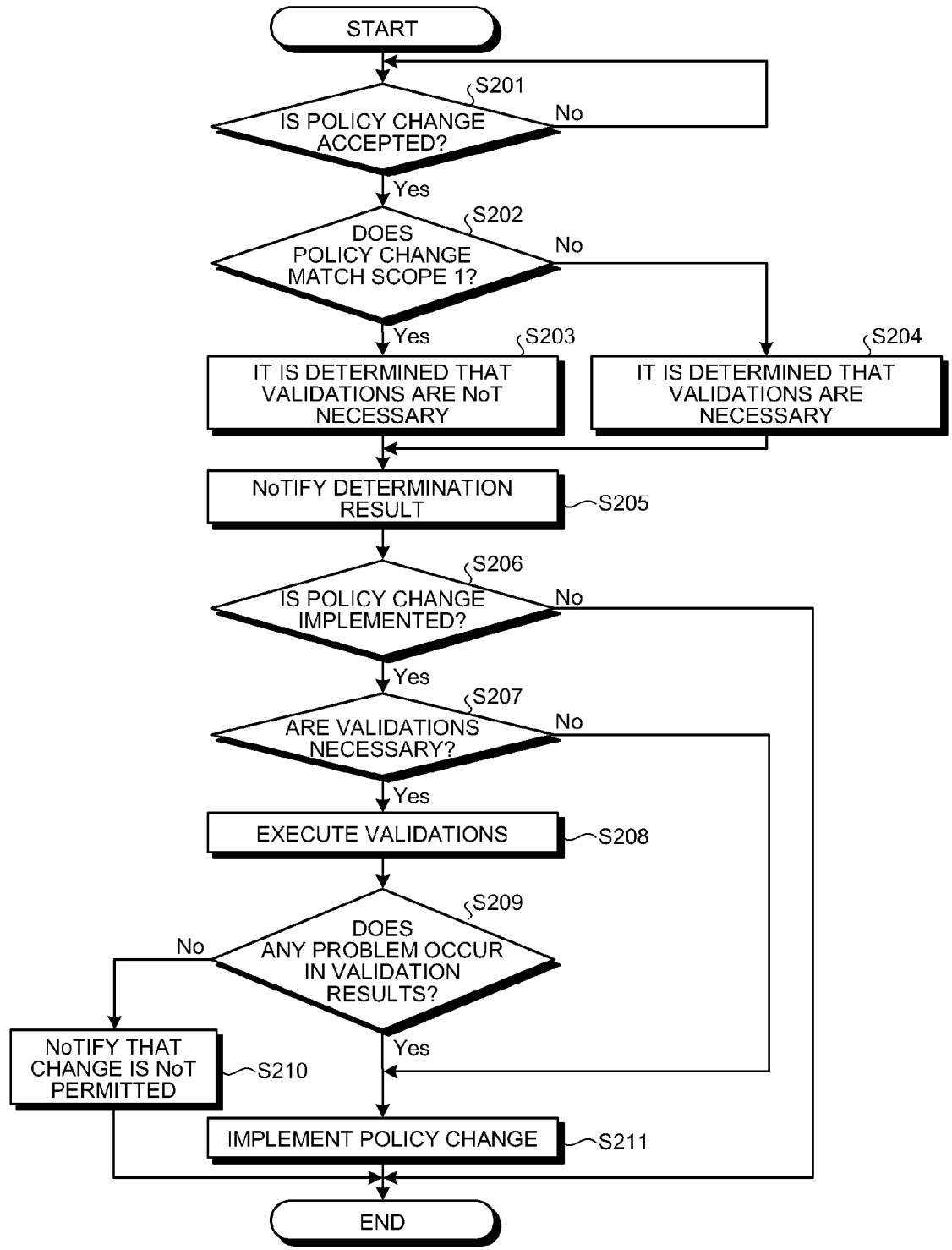
FIG. 8 is a flowchart of a changeable scope determination process according to the first embodiment.

A changeable scope determination process according to the first embodiment will now be explained with reference to FIG. 8. FIG. 8 is a flowchart of the changeable scope determination process according to the first embodiment.

As depicted in FIG. 8, upon accepting a policy change (for example, "a=4" or "a=9") (YES at Step S201), the changeable scope determining unit 32 determines whether the accepted policy change matches the scope 1 (for example, "a≦5") (Step S202). In other words, it is determined whether the accepted policy change is within a predetermined changeable scope.

If the changeable scope determining unit 32 determines that the accepted policy change (for example, "a=4") matches the scope 1 (for example, "a≦5") (YES at Step S202), it is determined that validations are not necessary (Step S203). If the changeable scope determining unit 32 determines that the accepted policy change (for example, "a=9") does not match the scope 1 (NO at Step S202), it is determined that the policy change needs to be validated against every other policy for a conflict (Step S204).

The changeable scope output unit 33 then outputs the result of the determination performed by the changeable scope determining unit 32 (Step S205). In other words, the example depicted in FIG. 6, the changeable scope output unit 33 displays and notifies of the determination result (for example, "can be changed immediately" or "requires validations") and a changeable scope (for example, "equal to or less than 5").

If an instruction for implementing the policy change is accepted (YES at Step S206), the change validating unit 34 validates whether the policy change should be implemented by the policy updating unit 35 (Step S207). If no instruction for implementing the change is accepted (NO at Step S206), the process is ended.

If the changeable scope determining unit 32 determines that no validation is necessary for the accepted policy change (NO at Step S207), the change validating unit 34 instructs the policy updating unit 35 to implement the change, to have the policy to be changed (Step S211). If the changeable scope determining unit 32 determines that the accepted policy change needs to be validated against every other policy for a conflict (YES at Step S207), the validations are executed (Step S208). If, as a result of the validations, it is determined that no problem occurs (no conflict would occur) (YES at Step S209), the change validating unit 34 instructs and causes the policy updating unit 35 to implement the policy change (Step S211). If it is determined that a problem occurs (a conflict would occur) (NO at Step S209), the change validating unit 34 notifies the user that the change is not permitted, and the process is ended (Step S210).

Effects of First Embodiment

As described above, according to the first embodiment, the policy change processing apparatus stores therein the changeable scope for each of a plurality of policies, and determines whether a policy content accepted as a change for a predetermined policy is within the changeable scope of the predetermined policy. Therefore, it is possible to determine, upon implementing the policy change, whether it is necessary to validate the policy change against every other policy for a conflict, and depending on situations, omit the validations. In other words, if it is determined that the policy content accepted as a change is within the changeable scope, the policy change can be implemented quickly without performing a validation against every other policy for a conflict.

Furthermore, according to the first embodiment, the policy change processing apparatus stores therein the policy content for each of the policies; stores therein related information for each of the policies; obtains any other policies that possibly result in a conflict with the selected policy from the related information; reads the policy content of the obtained other policies, calculates and stores therein a changeable scope. Therefore, the changeable scope can be calculated automatically, enabling a quick policy change.

Furthermore, according to the first embodiment, the policy change processing apparatus stores therein a policy content defined by an expression including an equation and/or an inequation as the above-described policy content for each policy; stores therein information that indicates how the selected policy is related to the obtained other policies, and that is defined by an expression including at least one of an equation and an inequation as the related information for each policy; and calculates the changeable scope, by solving the expressions included in the policy content of the selected policy, the policy content of the read other policies, and the information indicating how the selected policy is related to the read other policies, as simultaneous. Therefore, a relationship among each of the policies can be specified as a mathematical relationship, so that the changeable scope can be calculated easily by a mathematical operation.

Furthermore, according to the first embodiment, the policy change processing apparatus outputs the result of the determination to a predetermined output unit. Therefore, the user can be presented with information as to what kind of influence the policy change has, and with a policy change that needs re-validation, so that needless trials for policy changes can be omitted.

[b] Second Embodiment

In the first embodiment, the policy change processing apparatus simply determines whether a policy change will not result in a conflict with any other policies. However, the present invention is not limited to this, and the policy change processing apparatus may also determine whether a policy change will not conflict with any other policies belonging to the groups other than the one to which such a policy belongs.

Therefore, it will be explained below, as a second embodiment of the present invention, a case where it is also determined whether a policy change will not conflict with any policies belonging to the groups other than one to which the policy belongs. In the explanation below, the same points as those described above for the policy change processing apparatus according to the first embodiment will be mentioned only briefly.

Figure 9:
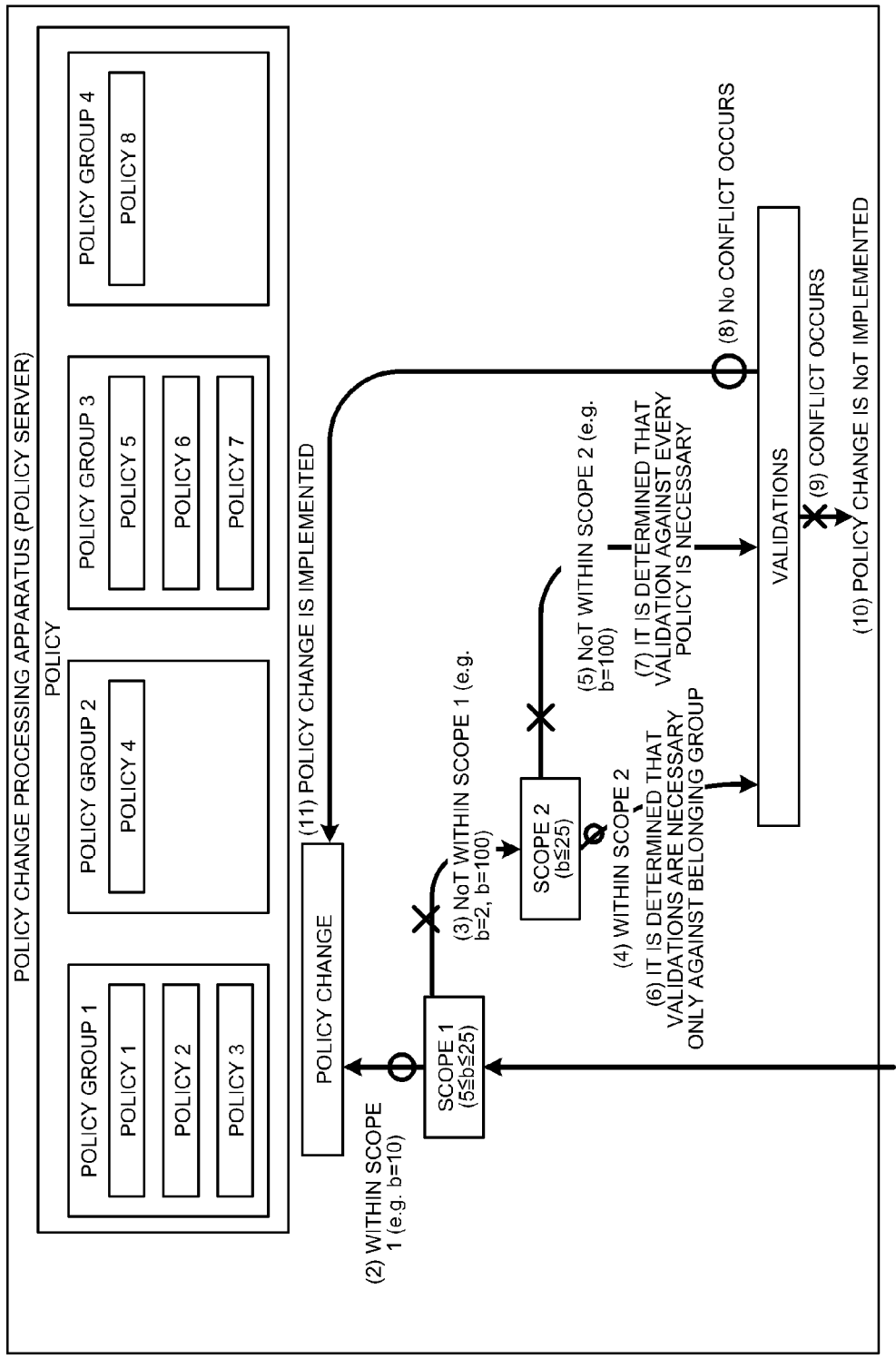
FIG. 9 is an illustrative diagram of characteristics of a policy change processing apparatus according to a second embodiment of the present invention.

Characteristics of Policy Change Processing Apparatus According to Second Embodiment To begin with, features of the policy change processing apparatus according to the second embodiment will be explained with reference to FIG. 9. FIG. 9 is an illustrative diagram of the characteristics of the policy change processing apparatus according to the second embodiment.

As depicted in this diagram, the policy change processing apparatus according to the second embodiment stores therein a plurality of policies, used for controlling a system, grouped into predetermined groups. In the example depicted in FIG. 9, policies are grouped into a policy group 1, a policy group 2, a policy group 3, and a policy group 4.

The policy change processing apparatus according to the second embodiment stores therein, for each of the policies, an out-of-group changeable scope indicating a scope where a content of a policy is changeable without causing any conflict with any policies belonging to the groups other than one to which such a policy belongs. In the example depicted in FIG. 9, the policy change processing apparatus further stores therein "$5 \leq b \leq 25$" as "scope 1" (a changeable scope), and "$b \leq 25$" as "scope 2" (an out-of-group changeable scope).

The policy change processing apparatus according to the second embodiment determines whether a policy content, accepted as a change of a predetermined policy, is within the out-of-group changeable scope, as well as within the changeable scope. More specifically, if the policy change processing apparatus determines that the accepted policy change (for example, "$b=2$" or "$b=100$") is not within the changeable scope of the predetermined policy (in the example depicted in FIG. 9, "scope 1 ($5 \leq b \leq 25$)") (see (3) in FIG. 9), the policy change processing apparatus further determines whether the policy change is within a predetermined out-of-group changeable scope (in the example depicted in FIG. 9, "scope 2 ($b \leq 25$)").

If the policy change processing apparatus according to the second embodiment determines that the accepted policy change (for example, "$b=2$") is within the predetermined out-of-group changeable scope (in the example depicted in FIG. 9, "scope 2 ($b \leq 25$)") (see (4) in FIG. 9), it is determined that such a change of the policy needs to be validated only against the policy group to which the policy belongs (for example, "policy group 1") (see (6) in FIG. 9), and validations for a conflict are performed only within the policy group to which the policy belongs. If the policy change processing apparatus determines that the accepted policy change (for example "$b=100$") is not within the predetermined out-of-group changeable scope (see (5) in FIG. 9), it is determined that such a change of the policy needs to be validated against every other policy (see (7) in FIG. 9), and validations for a conflict are performed against all policies.

As a result of validating the policies to be validated, if it is found that the policy change (for example, "$b=100$") results in a conflict (see (9) in FIG. 9), the policy change processing apparatus according to the second embodiment does not implement the policy change (see (10) in FIG. 9). If it is found that the policy change does not result in a conflict (see (8) in FIG. 9), the policy change is implemented (see (11) in FIG. 9).

Therefore, the policy change processing apparatus according to the second embodiment can narrow down a scope of policies validated for a conflict upon implementing a policy change, enabling the policy to be changed quickly. If a policy content, accepted as a change, can be determined to be within an out-of-group changeable scope, the policy can be changed quickly, without validating the change for a conflict, against every policy belonging to the groups other than the one to which the policy to be changed belongs.

It should be noted that a single policy can belong to a single policy group or a plurality of policy groups. For example, in the example depicted in FIG. 9, it is explained that the policy 1 belongs only to the policy group 1; however, the present invention is not limited to this, and the policy 1 may also belong to both the policy groups 1 and 2.

Structure of Policy Change Processing Apparatus According to Second Embodiment

Figure 10:
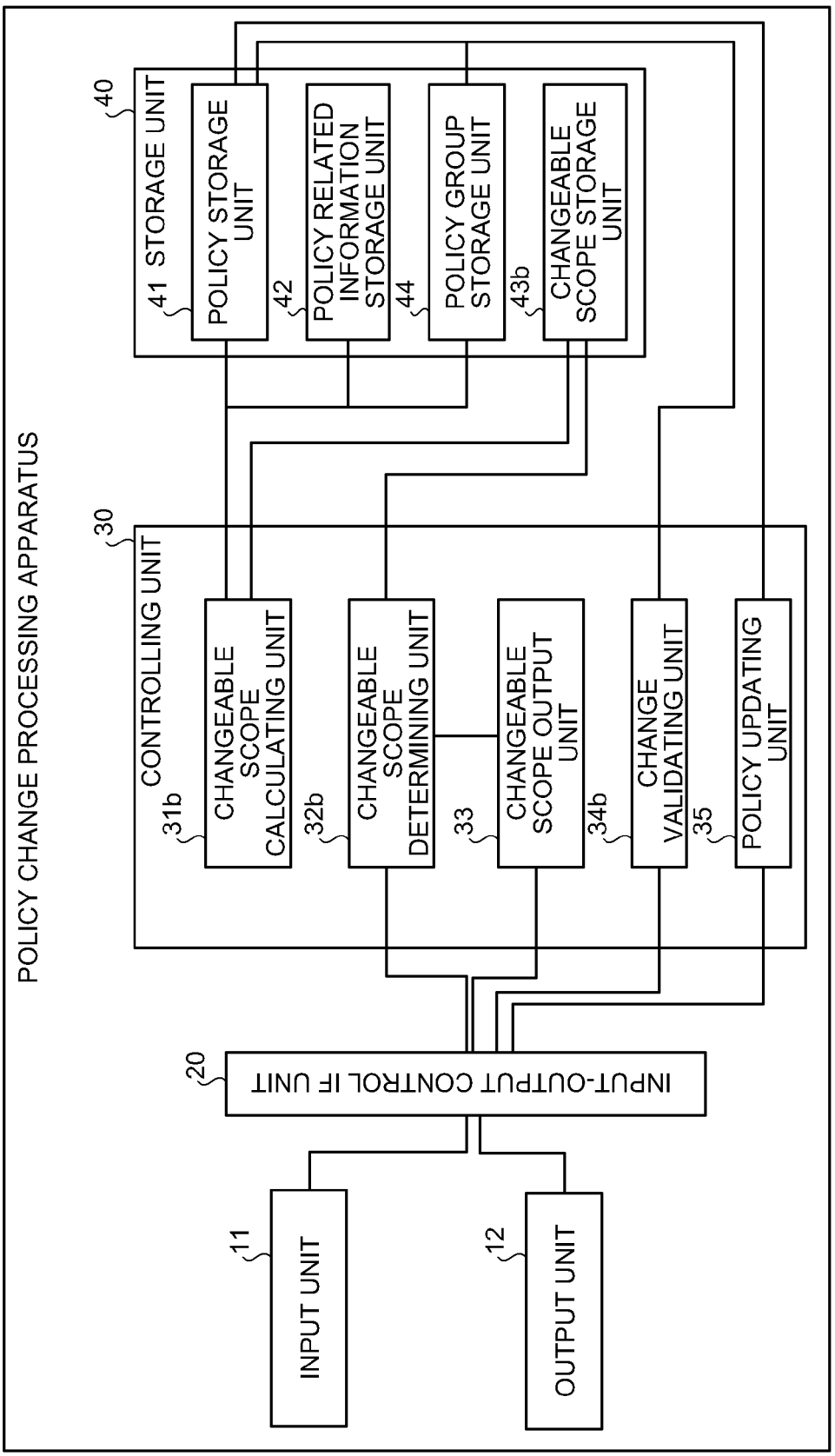
FIG. 10 is a block diagram of a structure of the policy change processing apparatus according to the second embodiment.

A structure of the policy change processing apparatus according to the second embodiment will now be explained with reference to FIG. 10. FIG. 10 is a block diagram of the structure of the policy change processing apparatus according to the second embodiment. As depicted in this diagram, the policy change processing apparatus according to the second embodiment includes the input unit 11, the output unit 12, the input-output control IF unit 20, the controlling unit 30, and the storage unit 40.

For the elements operating in the same manner as those according to the first embodiment, explanations thereof will be omitted herein. In the explanation below, only a changeable scope calculating unit 31b, a changeable scope determining unit 32b, a change validating unit 34b, a changeable scope storage unit 43b, and a policy group storage unit 44 are explained.

The policy group storage unit 44 stores therein groups in which a plurality of policies is grouped. More specifically, as depicted in FIG. 11, the policy group storage unit 44 stores therein a "policy group" that uniquely identifies a policy group, and a single or a plurality of "policy number(s)", while being related to each other. For example, the example depicted in FIG. 11, the policy group storage unit 44 stores therein "1" and "1, 2, 3" as a "policy group" and a "policy number", respectively, while being related to each other, and stores therein "2" and "4" as a "policy group" and a "policy number", respectively, while being related to each other. FIG. 11 is a diagram of an example of policy groups stored in the policy group storage unit according to the second embodiment.

The changeable scope storage unit 43b stores therein not only the changeable scope (scope 1), but also the out-of-group changeable scope for each of the policies. The out-ofgroup changeable scope is a scope where a policy content is changeable without causing a conflict with any other policies belonging to the groups other than the one to which such a policy belongs. More specifically, the changeable scope storage unit 43b stores therein not only the changeable scope (scope 1), but also maps and stores therein the "policy number" and the "scope 2" representing the out-of-group changeable scope, a depicted in FIG. 12. For example, in the example depicted in FIG. 12, the changeable scope storage unit 43b stores therein "2" and "b≦25" as a "policy number" and a "scope 2", respectively, while being related to each other and stores therein "5" and "d<5" as a "policy number" and a "scope 2", respectively, while being related to each other. FIG. 12 is a diagram of an example of the out-of-group changeable scopes stored in the changeable scope storage unit according to the second embodiment.

The changeable scope calculating unit 31b not only calculates the changeable scope (scope 1), but also obtains, for each of the policies, other policies that possibly result in a conflict with a selected policy, from the related information stored in the policy related information storage unit 42, reads the policy contents of the obtained other policies from the policy storage unit 41, and calculates the out-of-group changeable scope. More specifically, the changeable scope calculating unit 31b calculates the out-of-group changeable scope by solving an expression including an equation and/or an inequation included in the policy content of the selected policy, the policy content of the other policies read from the policy storage unit 41, and the information indicating how the selected policy is related to read other policies, as simultaneous. This process performed by the changeable scope calculating unit 31b will be explained later in details with reference to FIG. 13.

The changeable scope determining unit 32b not only determines whether a policy change is within a changeable scope, but also determines whether a policy content, accepted as a change to a predetermined policy, is within an out-of-group changeable scope of a predetermined policy, the out-of-group changeable scope being stored in the changeable scope storage unit 43b.

More specifically, upon accepting a policy change (for example, "b=4", "b=5", or "b=100"), if it is determined that the accepted policy change is not within a predetermined change scope (e.g., "5≦b≦25"), the changeable scope determining unit 32b further determines whether the accepted policy change is within the out-of-group changeable scope (for example, "b≦25"). If it is determined that the accepted policy change is within the out-of-group changeable scope (for example, "b=4"), it is determined that the validations are only needed to be performed against policies belonging to the group to which such a policy belong. If it is determined that the accepted policy change is not within the out-of-group changeable scope (for example, "b=100"), it is further determined that the validations are needed to be performed against every other policy for a conflict.

Upon accepting an instruction to implement the policy change, the change validating unit 34b validates whether such a policy change should be implemented by the policy updating unit 35. More specifically, if the changeable scope determining unit 32b determines that the accepted policy change does not need to be validated, the change validating unit 34b instructs and causes the policy updating unit 35 to implement the change, and the process is ended.

If the changeable scope determining unit 32b determines that the policy change needs to be validated against the policy group to which such a policy belongs, the change validating unit 34b performs the validations for a conflict only within the policy group to which such a policy belongs. If the changeable scope determining unit 32b determines that the accepted policy change needs to be validated against every other policy for a conflict, the change validating unit 34b performs the validations against every other policy for a conflict. As a result of the validations, if it is determined that no problem occurs (no conflict would occur), the change validating unit 34b instructs and causes the policy updating unit 35 to implement the change. If it is determined that a problem occurs (a conflict would occur), the change validating unit 34b notifies the user that the change is not permitted, and the process is ended.

Figure 13:
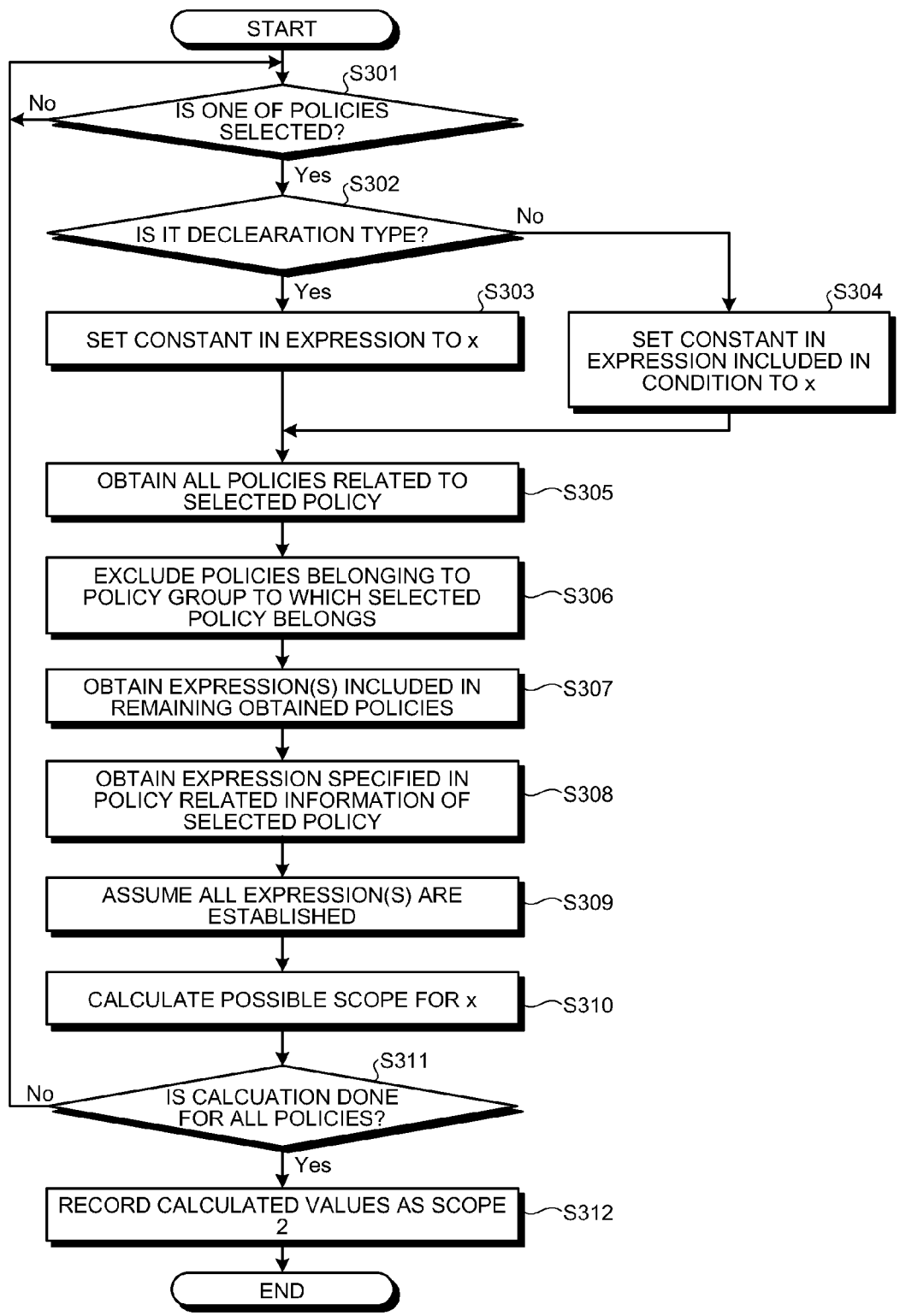
FIG. 13 is a flowchart of an out-of-group changeable scope calculation process according to the second embodiment.

Changeable Scope Calculation Process Performed by Policy Change Processing Apparatus According to Second Embodiment An out-of-group changeable scope calculation process according to the second embodiment will now be explained with reference to FIG. 13. FIG. 13 is a flowchart of the out-of-group changeable scope calculation process according to the second embodiment.

As depicted in FIG. 13, when the system is at first started, the changeable scope calculating unit 31b selects one of the policies stored in the policy storage unit 41 (Step S301), and determines whether the selected policy is a declaration type or a rule type (Step S302). If the policy is a declaration type (YES at Step S302), the changeable scope calculating unit 31b sets a constant in an expression included in the policy content to "x" (Step S303). If the policy is not a declaration type, (NO at Step S302), that is, if the policy is a rule type, the changeable scope calculating unit 31b sets a constant in an expression included in the condition of this policy to "x" (Step S304). For example, if a policy with "policy number: 2" and "policy content: upper limit, server pool b=5" is selected (see FIG. 3), because this policy is a declaration type, it is set to "upper limit, server pool b=x".

The changeable scope calculating unit 31b then obtains all policies related to the selected policy from the policy related information storage unit 42 (Step S305). For example, if the policy with "policy number: 2" and "policy content: upper limit, server pool b=5" is selected, the policy numbers related to "policy number: 2", that is, "policy numbers: 1, 3, 5, 6, 8", are obtained (See FIG. 4). The changeable scope calculating unit 31b then obtains the "policy contents" corresponding to the obtained "policy numbers".

The changeable scope calculating unit 31b then excludes the policies belonging to the policy group to which the selected policy belongs (Step S306). In other words, in the example depicted in FIG. 11, for example, if the policy with "policy number: 2" is selected, because this policy belongs to the policy group "1", the policies with "policy numbers: 1, 3" are excluded. Expressions included in the remaining policies, that is, those with "policy numbers: 5, 6, 8", are obtained (Step S307). For example, "d<5&&[s]e>1", "d==5&&e>1", and "s=25" are obtained (see FIG. 3). Then, the changeable scope calculating unit 31b obtains "how related", corresponding to the selected policy, stored in the policy related information storage unit 42 (Step S308). For example, "d<b", "d≦b", and "b≦s" are obtained (see FIG. 4).

The changeable scope calculating unit 31b then assumes that all of the obtained expressions are established (Step S309), and calculates a possible scope for the "x" (Step S310). For example, by assuming that "b=x", "d<5&&[s]e>1", "d==5&&e>1", and "s=25", "d<b", "d≦b", and "b≦s" are established to calculate "x", "b<25" is obtained.

If the changeable scope calculating unit 31b completes calculating the changeable scope for every one of these policies (YES at Step S311), the calculated changeable scopes are recorded as a scope 2 in the changeable scope storage unit 43 (Step S312), and the process is ended. If the changeable scope calculating unit 31b does not complete calculating a changeable scope for every one of the policies (NO at Step S311), the changeable scope calculating unit 31b selects other policies, and calculates changeable scopes (Steps S301 to S310).

Figure 14:
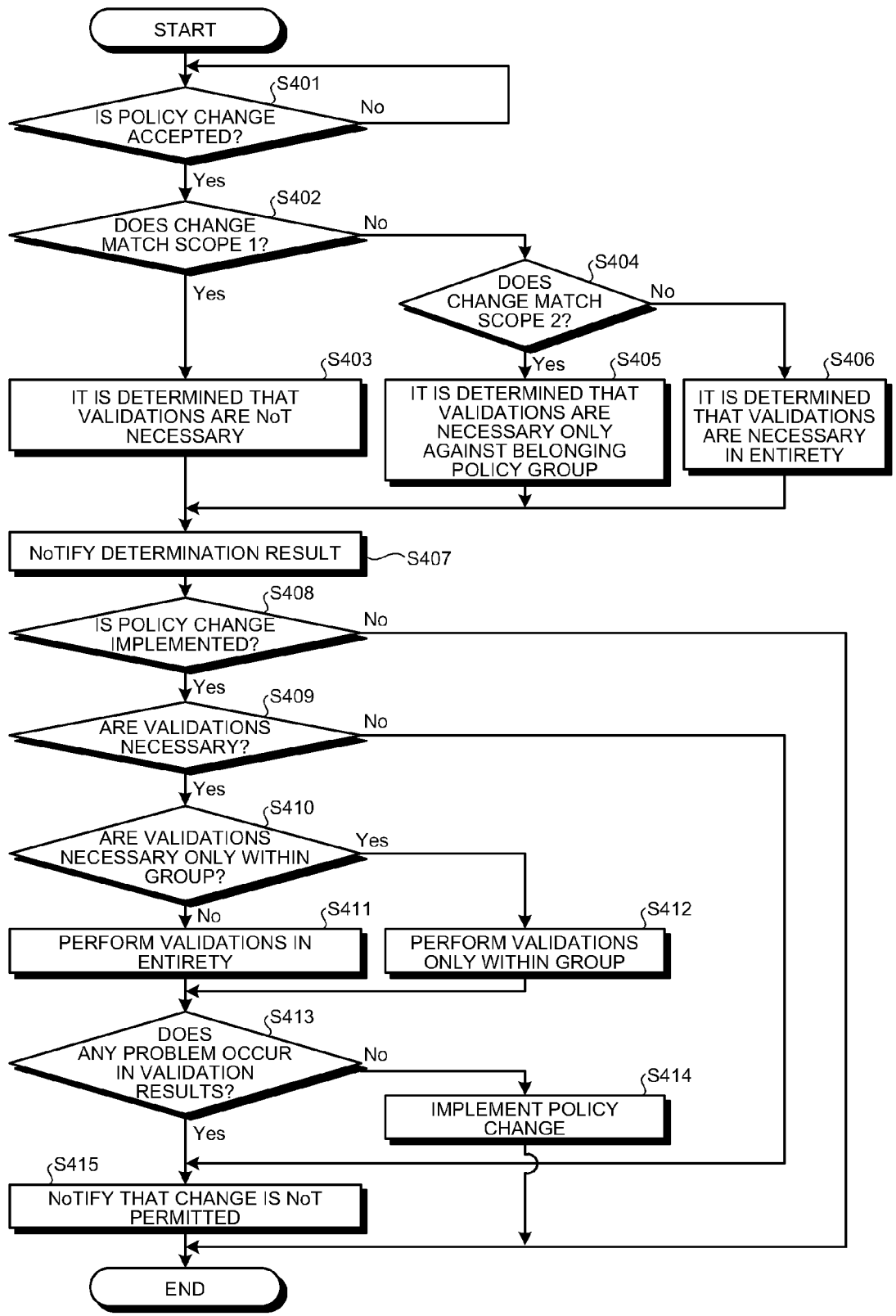
FIG. 14 is a flowchart of an out-of-group changeable scope determination process according to the second embodiment.

Policy Change Determination Process Performed by Policy Change Processing Apparatus According to Second Embodiment An out-of-group changeable scope determination process according to the second embodiment will now be explained with reference to FIG. 14. FIG. 14 is a flowchart of the out-of-group changeable scope determination process according to the second embodiment.

As depicted in FIG. 14, upon accepting a policy change (for example, "b=2", "b=10", or "b=100") (YES at Step S401) the changeable scope determining unit 32b determines whether the accepted policy change matches the scope 1 (for example, "5<b<25") (Step S402). In other words, it is determined whether the accepted policy change is within a predetermined changeable scope (for example, "5<b<25").

If the accepted change matches the scope 1 (for example, "5<b<25") (YES at Step S402), that is, if the accepted policy change (for example, "b=9") is within a predetermined changeable scope, the changeable scope determining unit 32b determines that no validation is necessary (Step S403). If the accepted policy change does not match the scope 1 (NO at Step S402), that is, if the accepted policy change (for example, "b=10" or "b=100") is not within the predetermined changeable scope, the changeable scope determining unit 32b further determines whether the accepted policy change matches the scope 2 (Step S404).

If the accepted policy change does not match the scope 1 but matches the scope 2 (NO at Step S402 and YES at Step S404), that is, if the accepted policy change (for example, "b=2") is within a predetermined out-of-group changeable scope (for example, "b<25"), the changeable scope determining unit 32b determines that the validations are necessary within the policy group to which the policy belongs (Step S405).

If the accepted policy change does not match either the scope 1 or the scope 2 (NO at Step S402 and NO at Step S404), that is, if the accepted policy change (for example, "b=100") is not within a predetermined out-of-group changeable scope (for example, "b<25"), the changeable scope determining unit 32b determines that the validation needs to be performed against every policy (all policies) (Step S406).

The changeable scope output unit 33 then notifies of a result of the determination performed by the changeable scope determining unit 32b (Step S407). In other words, if the policy change matches the scope 1, for example (YES at Step S402), the changeable scope output unit 33 makes a notification by outputting a screen data having the determination result, e.g., "can be changed immediately", as depicted in FIG. 6. If the policy change does not match the scope 1 but matches the scope 2 (NO at Step S402 and YES at Step S404), the changeable scope output unit 33 makes a notification by presenting a screen data having the determination result, e.g., "requires in-group validations", as depicted in FIG. 15. If the policy change does not match either the scope 1 or the scope 2 (NO at Step S402 and NO at Step S404), the changeable scope output unit 33 makes a notification by outputting a screen data having the determination result, e.g., "requires entire validations", as depicted in FIG. 16. FIGS. 15 and 16 are diagrams of examples of screens indicating the results of the policy change determination process according to the second embodiment.

If an instruction for implementing the change is accepted (YES at Step S408), the change validating unit 34b validates if the policy change should be implemented by the policy updating unit 35 (Step S409). If no instruction for implementing the change is accepted (NO at Step S408), the process is ended.

If the changeable scope determining unit 32b determines that no validation is necessary for the accepted policy change (NO at Step S409), the change validating unit 34b instructs the policy updating unit 35 to implement the change, to have the policy to be changed (Step S414).

If the changeable scope determining unit 32b determines that the accepted policy change needs to be validated only within the policy group to which the policy to be changed belongs (YES at Step S409 and YES at Step S410), the change validating unit 34b performs the validations for a conflict within the policy group to which the policy to be changed belongs (Step S412). If the changeable scope determining unit 32b determines that the accepted policy change needs to be validated for a conflict against every other policy (YES at Step S409 and NO at Step S410), the change validating unit 34b performs the validation against every other policy for a conflict (Step S411). If, as a result of the validations, it is determined that no problem occurs (no conflict would occur) (YES at Step S413), the change validating unit 34b instructs and causes the policy updating unit 35 to implement the change (Step S414). If it is determined that a problem occurs (a conflict would occur) (NO at Step S413), the change validating unit 34b notifies the user that the change is not permitted (Step S415), and the process is ended.

Effects of Second Embodiment

As described above, according to the second embodiment, the policy change processing apparatus stores therein the out-of-group changeable scope, as well as the changeable scope, and determines not only whether a policy content, accepted as a change for a predetermined policy, is within the changeable scope, but also whether the policy content is within the out-of-group changeable scope of such a predetermined policy. Therefore, it is possible, upon implementing a policy change, to determine whether validations for a conflict are necessary only within the same group, and depending on situations, to reduce the number of the validations. In other words, if it can be determined that a policy content, accepted as a change, is within the out-of-group changeable scope, validations need to be performed only within the same group, without performing a validation for a conflict against every other policy, thus enabling a policy to be changed quickly.

[c] Third Embodiment

The policy change processing apparatus according to the first and the second embodiments have been described above. However, the present invention may be implemented in various embodiments other than those described above. Therefore, other embodiments of the present invention will be explained as the policy change processing apparatus according to a third embodiment of the present invention.

(1) Timing For Calculating Changeable Scope, Etc.

In the embodiments described above, the changeable scope and/or the out-of-group changeable scope are calculated when the system is at first started. However, the present invention is not limited to this, and the calculation may also be performed when the policy is changed.

More specifically, upon changing a policy content for any of the policies stored in a predetermined storage unit, the policy change processing apparatus obtains other policies that possibly result in a conflict with the policy whose content is changed, and calculates the changeable scope and/or the out-of-group changeable scope.

Figure 17:
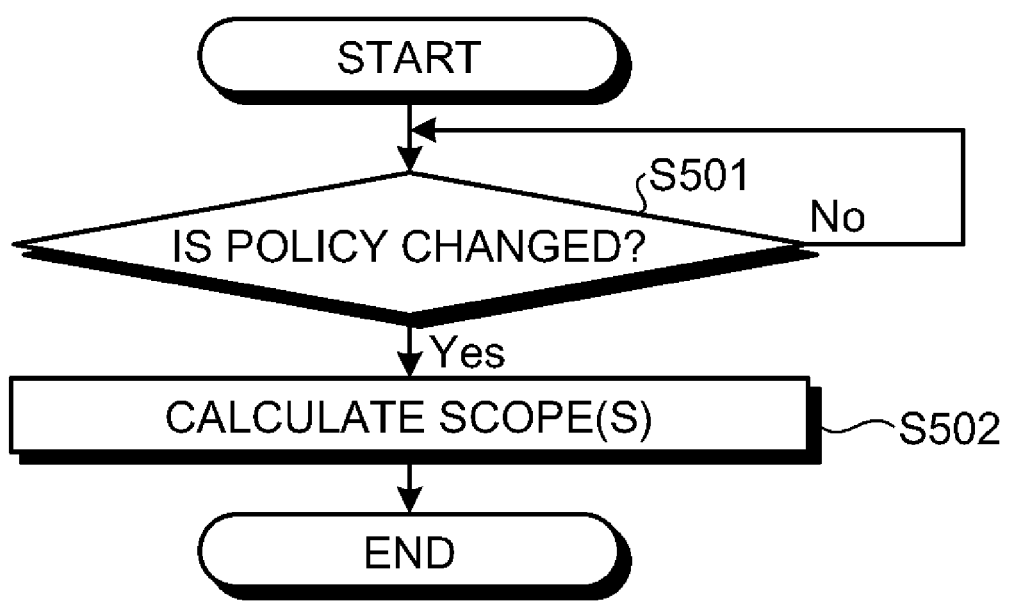
FIG. 17 is a flowchart of re-calculation of the changeable scope according to a third embodiment of the present invention.

To be described in more detail, as depicted in FIG. 17, if a policy is changed by the policy updating unit 35 in the manner depicted in FIG. 8 or 14 (YES at Step S501) that is, if the content of the policy change, received via the input unit 11, is reflected onto and updates the policy stored in the policy storage unit 41, the changeable scope and/or the out-of-group changeable scope is re-calculated (Step S502). FIG. 17 is a flowchart of re-calculation of the changeable scope according to the third embodiment.

In this manner, when a policy content is changed, the changeable scope and/or the out-of-group changeable scope is calculated. Therefore, when the policy change is implemented, the changeable scope or the out-of-group changeable scope is re-calculated immediately. As a result, the policy change can be executed successively.

The policy change processing apparatus may re-calculate the changeable scope and/or the out-of-group changeable scope for each of the policies when the policy is changed; or, alternatively, the policy change processing apparatus may perform the re-calculation only for policies that are affected by the policy change (policies that are related to the changed policy). To explain it with an example, in the example depicted in FIG. 4, if a policy change is implemented to change the "policy 1" from "a=1" to "a=4", the re-calculation may be performed only for the "policy 2" that is the policy related to the "policy 1". Alternatively, the re-calculation may be performed for every other policy, for example.

In the embodiments described above, the changeable scope and/or the out-of-group changeable scope is calculated when the system is at first started, or when the policy change is implemented. However, the present invention is not limited to this, and the calculation may be performed at any timing at a user's discretion, or once in every fixed time period.

(2) Method For Calculating Changeable Scope, Etc.

In the embodiments described above, the changeable scope and the out-of-group changeable scope are calculated mathematically. However, the present invention is not limited to this, and the calculation may be performed by trying out values one by one, i.e., by way of simulation.

(3) System

In addition, any one of the processes explained, to be performed automatically in the embodiments may also be performed manually in whole or part (for example, performing the policy update automatically). Furthermore, any processes, control procedure, specific names, information including various data or parameters mentioned herein or in the drawings (for example, FIGS. 1, 3, 4, 5, 6, 9, 11, 12, 15, and 16) may be modified in any way unless otherwise specified herein.

Furthermore, each of the constitutive elements provided with the apparatus in each embodiment, depicted in the drawings, is described as functional concepts, and does not necessarily have to be structured physically as depicted in the drawings. In other words, a specific distributive or integrative structure of the apparatus in each embodiment is not limited to those depicted in the drawings, and whole or any part thereof may be functionally or physically distributed or integrated in any unit depending on various loads or usage (for example, the changeable scope calculating unit 31 and the changeable scope determining unit 32, depicted in FIG. 2, may be integrated, or the policy updating unit 35 may be separately structured). Furthermore, each of the processing functions performed by the apparatus in each embodiment may be implemented by a CPU, a computer program analyzed and executed by the CPU, or as hardware using wired logics.

Figure 18:
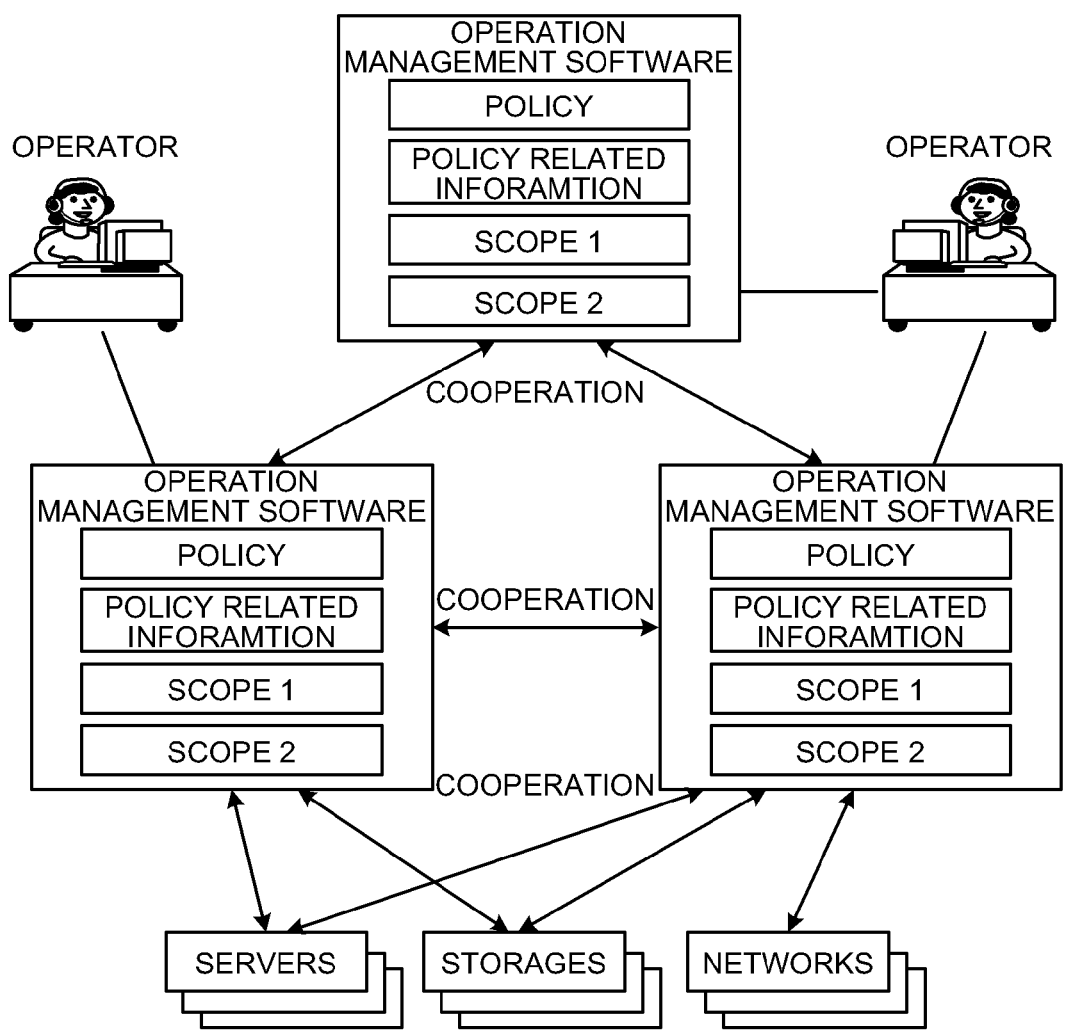
FIG. 18 is a diagram of an example of a computer system using the present invention.

Furthermore, in the embodiments described above, it is explained that the policy change processing apparatus exists as an independent apparatus to control the system by way of policy-based control. However, the present invention is not limited to such an embodiment, and the policy change processing apparatus does not have to exist as an independent apparatus. For example, as depicted in FIG. 18, each system may be embedded with the policy change processing apparatus according to the present invention, and each of the systems may work together to realize the present invention. FIG. 18 is a diagram of an example of a computer system using the present invention.

(4) Policy Change Processing Program

Figure 19:
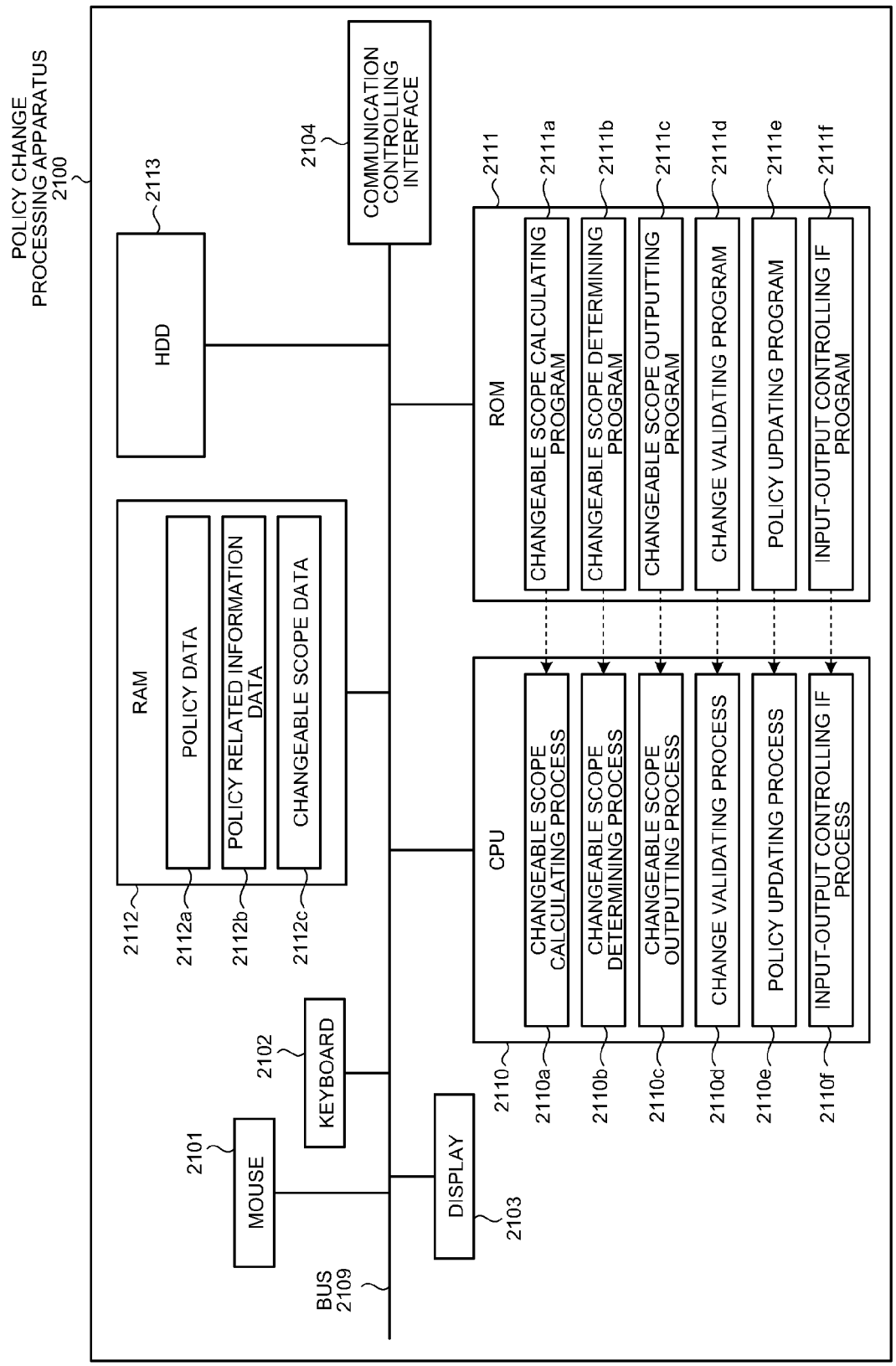
FIG. 19 is a diagram of a computer program for the policy change processing apparatus according to the first embodiment.

In the first embodiment, it is explained that various processes are realized by hardware logics. However, the present invention is not limited to this, and the processes may be realized by causing a computer to execute a computer program prepared in advance. In the explanation below, an example of a computer executing a policy change processing program, having the same functions as the policy change processing apparatus explained above for the first embodiment, will be explained with reference to FIG. 19. FIG. 19 is a diagram of a computer program for the policy change processing apparatus according to the first embodiment.

As depicted in this drawing, the policy change processing apparatus includes a mouse 2101, a keyboard 2102, a display 2103, a communication controlling interface 2104, a central processing unit (CPU) 2110, a read only memory (ROM) 2111, a random access memory (RAM) 2112, and a hard disk drive (HDD) 2113, all of which are connected via a bus 2109, for example.

A control program and an input-output controlling program, respectively having the same functions as the controlling unit 30 and the input-output control IF unit 20 according to the first embodiment, are stored in advance in the ROM 2111. In other words, as depicted in FIG. 19, a changeable scope calculating program 2111a, a changeable scope determining program 2111b, a changeable scope outputting program 2111c, a change validating program 2111d, a policy updating program 2111e, and an input-output controlling program 2111f are stored in advance in the ROM 2111. It should be noted that these programs 2111a to 2111f may be integrated or separated as appropriate, in the same manner as each of the constitutive elements of the policy change processing apparatus depicted in FIG. 2.

By the CPU 2110 reading these programs 2111a to 2111f from the ROM 2111 and executing these programs, each of the programs 2111a to 2111f are caused to function as a changeable scope calculating process 2110a, a changeable scope determining process 2110b, a changeable scope outputting process 2110c, a change validating process 2110d, a policy updating process 2110e, an input-output controlling process 2110f, as depicted in FIG. 19. Each of the processes 2110a to 2110f respectively corresponds to the changeable scope calculating unit 31, the changeable scope determining unit 32, the changeable scope output unit 33, the change validating unit 34, the policy updating unit 35, and the input-output control IF unit 20, depicted in FIG. 2.

The CPU 2110 executes the policy change processing program based on policy data 2112a, policy related information data 2112b, and changeable scope data 2112c, all of which are stored in the RAM 2112.

Each of the programs 2111a to 2111f, explained in this embodiment, does not need to be stored in ROM from the beginning. These programs may be stored in, for example, a "portable physical medium", such as a memory card, a flexible disk, a CD-ROM, an MO disk, a DVD, a magnet-optical disk, or an IC card, inserted into the policy change processing apparatus; a "fixed physical medium", such as a HDD, provided internally or externally to the policy change processing apparatus; or stored in "another computer (or server)" connected to the policy change processing apparatus over a public network, the Internet, a LAN, or a WAN, and causing the policy change processing apparatus to execute each of the programs read therefrom.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A computer readable storage medium containing instructions for processing a change in a content of a plurality of policies specified so that contents of the policies do not conflict with each other, wherein the instructions, when executed by a computer, cause the computer to execute:
    storing a changeable scope and an out-of-group changeable scope for each of the policies grouped into groups in a first storage unit, the changeable scope indicating a scope where a policy content is changeable without causing a conflict with any other policies and the out-of-group changeable scope indicating a scope where a content of a policy is changeable without causing a conflict with any other policies belonging to groups other than the one to which such a policy belongs; and
    determining whether a policy content accepted as a change target of a predetermined policy is within the changeable scope of the predetermined policy, the changeable scope being stored in the storing of the changeable scope, and whether the policy content accepted as the change target of the predetermined policy is within the out-of-group changeable scope of the predetermined policy, the out-of-group changeable scope being stored in the storing of the changeable scope.

2. The computer readable storage medium according to claim 1, wherein the instructions further cause the computer to execute:
    storing a policy content for each of the policies in a second storage unit;
    storing related information for each of the policies in a third storage unit, the related information indicating whether a policy has a relationship with any other policies that possibly result in a conflict; and
    calculating the changeable scope by obtaining another policy that possibly results in a conflict with a selected policy, from the related information stored in the storing of the related information, and by reading a policy content of the obtained another policy from the second storage unit, wherein
    in the storing of the changeable scope, the changeable scope calculated in the calculating is stored.

3. The computer readable storage medium according to claim 2, wherein
    in the string of the policy, a policy content defined by an expression including at least one of an equation and an inequation is stored in the second storage unit as the policy content for each of the policies,
    in the storing of the related information, information that indicates how the selected policy is related to the obtained another policy, and that is defined by an expression including at least one of an equation and an inequation is stored in the third storage unit as the related information for each of the policies, and
    in the calculating, the changeable scope is calculated by solving the expressions included in the policy content of the selected policy, the policy content of the obtained another policy, and the information indicating how the selected policy is related to the obtained another policy, as simultaneous.

4. The computer readable storage medium according to claim 2, wherein
    in the calculating, when a policy content is changed for one of the policies stored in the storing of the policy, the changeable scope is calculated by obtaining another policy that possibly results in a conflict with the policy whose content is changed.

5. The computer readable storage medium according to claim 1, wherein the instructions further cause the computer to execute:
    outputting a determination result that is determined in the determining to a predetermined output unit.

6. The computer readable storage medium according to claim 1, wherein the instructions further cause the computer to execute:
    storing a policy content for each of the policies in a second storage unit;
    storing related information for each of the policies in a third storage unit, the related information indicating whether a policy has a relationship with any other policies that possibly result in a conflict; and
    calculating the out-of-group changeable scope by obtaining another policy that possibly results in a conflict with a selected policy, from the related information stored in the storing of the related information, and by reading a policy content of the obtained another policy from the second storage unit, wherein
    in the storing of the changeable scope, the out-of-group changeable scope calculated in the calculating is stored.

7. The computer readable storage medium according to claim 6, wherein
    in the string of the policy, a policy content defined by an expression including at least one of an equation and an inequation is stored in the second storage unit as the policy content for each of the policies,
    in the storing of the related information, information that indicates how the selected policy is related to the obtained another policy, and that is defined by an expression including at least one of an equation and an inequation is stored in the third storage unit as the related information for each of the policies, and
    in the calculating, the out-of-group changeable scope is calculated by solving the expressions included in the policy content of the selected policy, the policy content of the obtained another policy, and the information indicating how the selected policy is related to the obtained another policy, as simultaneous.

8. The computer readable storage medium according to claim 6, wherein in the calculating, when a policy content is changed for one of the policies stored in the storing of the policy, the out-of-group changeable scope is calculated by obtaining another policy that possibly results in a conflict with the policy whose content is changed.

9. A policy change processing method that is used for controlling a system, and that is a method of processing a change in a content of a plurality of policies specified so that contents of the policies do not conflict with each other, the policy change processing method comprising:

storing a changeable scope and an out-of-group changeable scope for each of the policies grouped into groups, the changeable scope indicating a scope where a policy content is changeable without causing a conflict with any other policies and the out-of-group changeable scope indicating a scope where a content of a policy is changeable without causing a conflict with any other policies belonging to groups other than the one to which such a policy belongs; and determining, using a processor, whether a policy content accepted as a change target of a predetermined policy is within the changeable scope of the predetermined policy, the changeable scope being stored in the storing of the changeable scope and whether the policy content accepted as the change target of the predetermined policy is within the out-of-group changeable scope of the predetermined policy, the out-of-group changeable scope being stored in the storing of the changeable scope.

10. A policy change processing apparatus that is used for controlling a system, and that processes a change in a content of a plurality of policies specified so that contents of the policies do not conflict with each other, the policy change processing apparatus comprising:

a processor and a memory,
wherein the processor includes a changeable scope storing unit that stores therein a changeable scope and an out-of-group changeable scope for each of the policies grouped into groups, the changeable scope indicating a scope where a policy content is changeable without causing a conflict with any other policies and the out-of-group changeable scope indicating a scope where a content of a policy is changeable without causing a conflict with any other policies belonging to groups other than the one to which such a policy belongs; and a changeable scope determining unit that determines whether a policy content accepted as a change target of a predetermined policy is within the changeable scope of the predetermined policy, the changeable scope being stored in the changeable scope storing unit and whether the policy content accepted as the change target of the predetermined policy is within the out-of-group changeable scope of the predetermined policy, the out-of-group changeable scope being stored in the storing of the changeable scope.

11. A computer-readable, non-transitory media storing a program for changing a policy value of policies, a system being controlled in accordance with the policies, the program causing a computer to execute a procedure comprising:

storing a changeable scope for each of the policies in a memory, the changeable scope indicating a scope where a policy value is changeable without causing a conflict with any other policies;

determining, by the computer, whether a target policy value of a policy to be changed is within the changeable scope of the policy to be changed;

changing, by the computer, a policy value of the policy to be changed to the target policy value in response to confirming that the target policy value of the policy to be changed does not conflict with policy values of other policies when the target policy values is not within the changeable policy value of the policy to be changed; and changing, by the computer, the policy value of the policy to be changed to the target policy value without checking policy values of other policies when the target policy value is within the changeable scope of the policy to be changed.

* * * * *